United States Patent
Iwanaga et al.

(10) Patent No.: US 12,498,054 B2
(45) Date of Patent: Dec. 16, 2025

(54) SOLENOID VALVE (71) Applicant: EAGLE INDUSTRY CO., LTD., Tokyo (JP)

(72) Inventors: Hiroyuki Iwanaga, Tokyo (JP); Hiroshi Noguchi, Tokyo (JP); Naoki Nishimura, Tokyo (JP); Akitaka Matsuzaki, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 4 days.

(21) Appl. No.: 18/292,870

(22) PCT Filed: Aug. 2, 2022

(86) PCT No.: PCT/JP2022/029584
§ 371 (c)(1),
(2) Date: Jan. 26, 2024

(87) PCT Pub. No.: WO2023/013620
PCT Pub. Date: Feb. 9, 2023

(65) Prior Publication Data
US 2025/0084930 A1  Mar. 13, 2025

(30) Foreign Application Priority Data
Aug. 5, 2021 (JP) ................ 2021-129319

(51) Int. Cl.
*F16K 31/06* (2006.01)
(52) U.S. Cl.
CPC ...... *F16K 31/0675* (2013.01); *F16K 31/0655* (2013.01)
(58) Field of Classification Search
USPC ....................... 251/129.02, 129.15
See application file for complete search history.

(56) References Cited

U.S. PATENT DOCUMENTS 6,929,240 B2 * 8/2005 Ueda .................. F16K 7/20
  251/359
6,994,406 B1 * 2/2006 Krawczyk ............ B60T 8/367
  303/119.2

(Continued)

FOREIGN PATENT DOCUMENTS

JP       11132355       5/1999   ............. F16K 31/06
JP    H11287354 A    10/1999

(Continued)

OTHER PUBLICATIONS

International Search Report and Written Opinion issued in PCT/JP2022/029584, dated Oct. 11, 2022, with English translation, 11 pgs.

(Continued)

Primary Examiner — Matthew W Jellett
(74) Attorney, Agent, or Firm — HAYES SOLOWAY P.C.

(57) ABSTRACT

A solenoid valve capable of stably controlling the flow rate or pressure of a fluid includes: a valve body; a valve seat on which the valve body is to be seated; a solenoid including a movable iron core, a rod, and a fixed iron core, and exerting a driving force on the valve body in a valve closing direction; a spring biasing the valve body in a valve opening direction; and a valve housing partially defining a valve chamber in which the valve body and the valve seat are disposed. A spring chamber in which the spring is disposed is formed between the valve chamber and the fixed iron core, and the valve body isolates the valve chamber and the spring chamber from each other when the valve is opened.

8 Claims, 6 Drawing Sheets

(56) References Cited

U.S. PATENT DOCUMENTS

| | | | | |
|---|---|---|---|---|
| 7,871,056 B2* | 1/2011 | Kratzer | ............... | B60T 8/3675 |
| | | | | 251/129.02 |
| 8,118,054 B2* | 2/2012 | Glaudel | ............... | H01F 7/1607 |
| | | | | 335/255 |
| 8,123,193 B2* | 2/2012 | Kratzer | ............... | F16K 31/0658 |
| | | | | 137/15.17 |
| 8,474,787 B2* | 7/2013 | Fink | ............... | B60T 8/363 |
| | | | | 137/550 |
| 8,500,086 B2* | 8/2013 | Kratzer | ............... | B60T 8/363 |
| | | | | 303/119.2 |
| 8,651,453 B2* | 2/2014 | Heyer | ............... | F16K 31/0655 |
| | | | | 251/129.02 |
| 9,010,724 B2* | 4/2015 | Jin | ............... | F16K 3/267 |
| | | | | 251/129.02 |
| 10,119,627 B2* | 11/2018 | Des Garennes | ...... | F16K 11/044 |
| 11,110,905 B2* | 9/2021 | Jeon | ............... | B60T 15/043 |
| 11,215,292 B2* | 1/2022 | Bähr | ............... | F16K 3/24 |
| 11,714,019 B2* | 8/2023 | Lucka | ............... | F01M 11/10 |
| | | | | 60/605.1 |
| 2009/0050829 A1* | 2/2009 | Haynes | ............... | F16K 31/0606 |
| | | | | 251/129.08 |
| 2017/0356430 A1 | 12/2017 | Irie et al. | | |
| 2021/0095781 A1 | 4/2021 | Nakanishi et al. | | |
| 2021/0285434 A1 | 9/2021 | Hayama et al. | | |

FOREIGN PATENT DOCUMENTS

| | | | | |
|---|---|---|---|---|
| JP | 2010138960 | | 6/2010 | ............ F16K 31/06 |
| JP | 202150810 | | 4/2021 | ............ F16K 31/06 |
| WO | WO 2020032088 | | 2/2020 | ............ F04B 27/18 |

OTHER PUBLICATIONS

International Preliminary Report on Patentability issued in PCT/JP2022/029584, dated Feb. 15, 2024, 5 pgs.

* cited by examiner

SOLENOID VALVE

TECHNICAL FIELD

The present invention relates to a solenoid valve, for example, a solenoid valve that controls a fluid.

BACKGROUND ART

A solenoid valve used to control a fluid in various industrial fields includes a valve body that comes into contact with and separates from a valve seat in response to electric power input to a solenoid, and can control the flow rate or pressure of the fluid by adjusting a valve opening degree.

Examples of typical forms of such a valve include a spool-type valve in which a spool that is a valve body moves parallel to an opening that is a valve seat, and a poppet-type valve in which a valve body moves orthogonally to an opening that is a valve seat. Among these valves, the poppet-type valve is most suitable for controlling the flow rate or pressure.

For example, a poppet-type solenoid valve illustrated in Patent Citation 1 mainly includes a valve housing that defines a valve chamber in which a valve body and a valve seat are disposed; a solenoid for exerting a driving force on the valve body in a valve closing direction; and a spring that biases the valve body in a valve opening direction. In the solenoid, when a coil is energized, a movable iron core is attracted to a fixed iron core by a magnetic force. When the movable iron core is attracted, a rod fixed to the movable iron core follows, the valve body moves toward the valve seat together with the rod, the valve body is seated on the valve seat, so that the solenoid valve is closed. In addition, when the energization of the coil is stopped, the valve body is moved in the valve opening direction by the biasing force of the spring, and the valve body is separated from the valve seat, so that the solenoid valve is opened.

CITATION LIST

Patent Literature

Patent Citation 1: JP 2021-50810 A (Page 5, FIG. 3)

SUMMARY OF INVENTION

Technical Problem

In such a solenoid valve disclosed in Patent Citation 1, the spring is externally fitted to the valve body on a solenoid side of an inflow passage and an outflow passage. For this reason, the fixed iron core or the movable iron core is not limited in shape by the spring, and a sufficient magnetic path is easily formed. In addition, the flow of the fluid from the inflow passage to the outflow passage is less likely to be obstructed. By the way, when the valve is opened, the fluid flows from the valve chamber into a space inside the solenoid or a radially outer space of the valve body in which the spring is disposed. When contamination is contained in the fluid, the function of the solenoid or the spring is impaired, thereby hindering the control of the flow rate or pressure, which is a risk.

The present invention has been made in view of such a problem, and an object of the present invention is to provide a solenoid valve capable of stably controlling the flow rate or pressure of a fluid.

Solution to Problem

In order to solve the foregoing problem, according to the present invention, there is provided a solenoid valve of poppet-type, including: a valve body; a valve seat on which the valve body is to be seated; a solenoid including a movable iron core, a rod, and a fixed iron core, and exerting a driving force on the valve body in a valve closing direction; a spring that biases the valve body in a valve opening direction; and a valve housing partially defining a valve chamber in which the valve body and the valve seat are disposed, wherein a spring chamber in which the spring is disposed is formed between the valve chamber and the fixed iron core, and the valve body isolates the valve chamber and the spring chamber from each other when the valve is opened. According to the aforesaid feature of the present invention, when the valve is opened, the spring chamber is isolated from the valve chamber by the valve body. For this reason, when the valve is opened, it is extremely difficult for a fluid to flow into the spring chamber. Accordingly, when the valve is opened, it is difficult for the fluid containing contamination to flow from the valve chamber into the spring chamber, so that it is difficult for the function of the solenoid or the spring to be impaired. Therefore, the solenoid valve can stably control the flow rate or pressure of the working fluid.

It may be preferable that the valve body is brought into contact with the valve housing when the valve is opened. According to this preferable configuration, the valve body in contact with the valve housing can more suitably prevent the fluid from flowing into the spring chamber. In addition, the housing functions as a stopper that holds the position of the valve body when the valve is opened. Therefore, the configuration of the solenoid valve is simplified. In addition, at the end of energization, the valve body moves in the valve opening direction, and when the valve body reaches a fully open state, the flow of the fluid from the spring chamber toward the valve chamber occurs between the spring chamber and the valve chamber. Accordingly, contamination is easily discharged from the spring chamber.

It may be preferable that a passage communicating between the valve chamber and the spring chamber is provided. According to this preferable configuration, in a valve open state, the fluid flows in and out of the spring chamber from the valve chamber through the passage. For this reason, at the start of energization, the valve body smoothly moves in a valve closing direction, and at the end of energization, the valve body smoothly moves in the valve opening direction, and reaches a fully open state.

It may be preferable that the passage is formed of a groove formed in the valve body. According to this preferable configuration, the configuration of the passage is simplified.

It may be preferable that the spring is a conical coil spring, and the rod is provided with a spring stopper with which a small-diameter end of the spring comes into contact. According to this preferable configuration, the spring stopper is less likely to be subjected to resistance of the fluid, and the driving force of the solenoid can be reduced.

It may be preferable that the valve body and the rod are connected to each other. According to this preferable configuration, the sliding of one of the rod and the valve body is guided, so that a sliding guide for the other can be omitted. Namely, the solenoid valve has a simple alignment structure.

DESCRIPTION OF EMBODIMENTS

Modes for implementing a solenoid valve according to the present invention will be described below based on embodiments.

First Embodiment

A solenoid valve according to a first embodiment of the present invention will be described with reference to FIGS. 1 to 4. Hereinafter, a description will be made based on the fact that the top and bottom of FIG. 1 when is viewed from the front correspond to the top and bottom of the solenoid valve. In detail, a description will be made based on the fact that the upper side of the drawing sheet on which a solenoid is disposed corresponds to an upper side of the solenoid valve, and the lower side of the drawing sheet on which a valve housing is disposed corresponds to a lower side of the solenoid valve.

Figure 1:
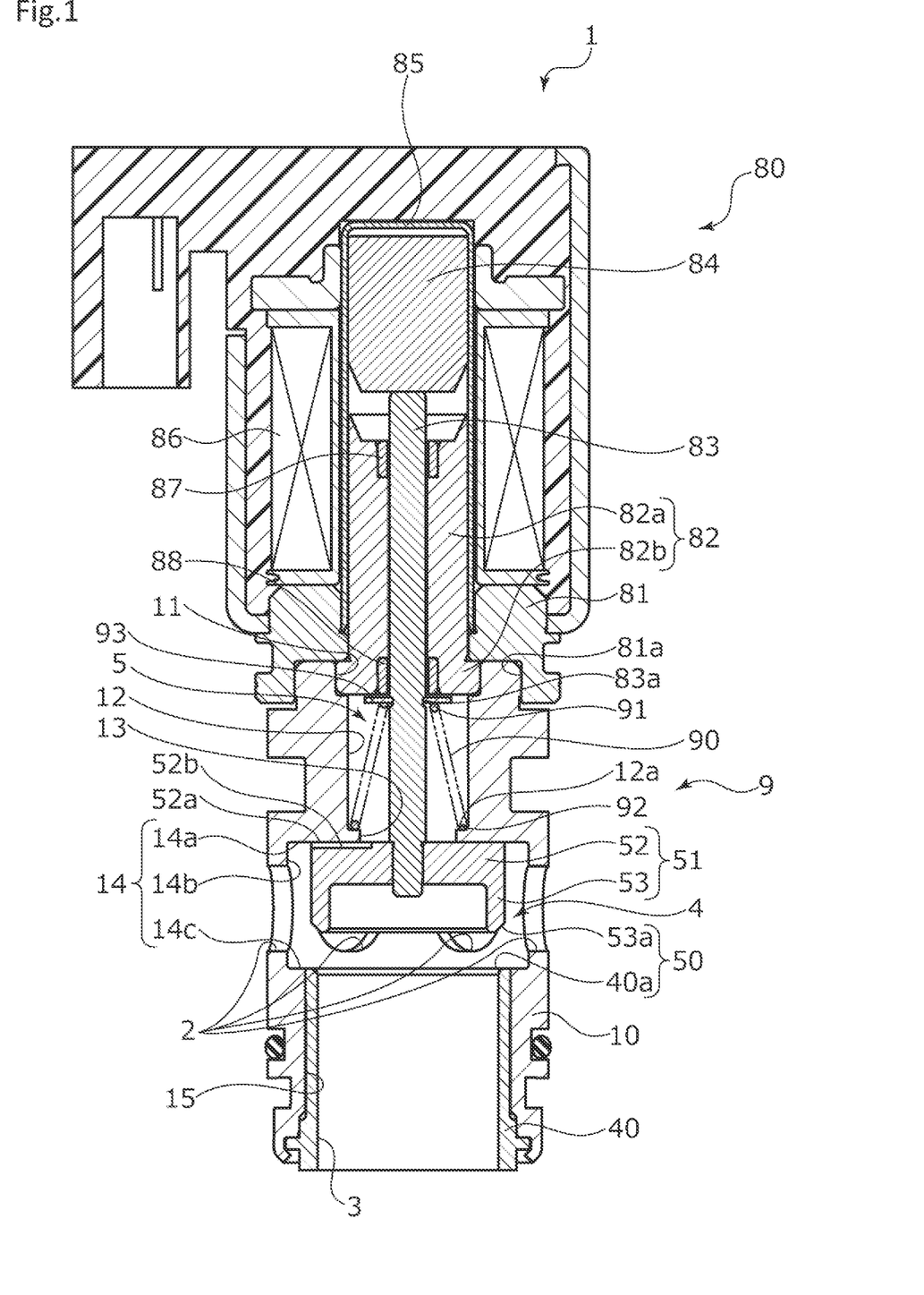
FIG. 1 is a cross-sectional view of a solenoid valve according to a first embodiment of the present invention when the valve is closed.
Figure 2:
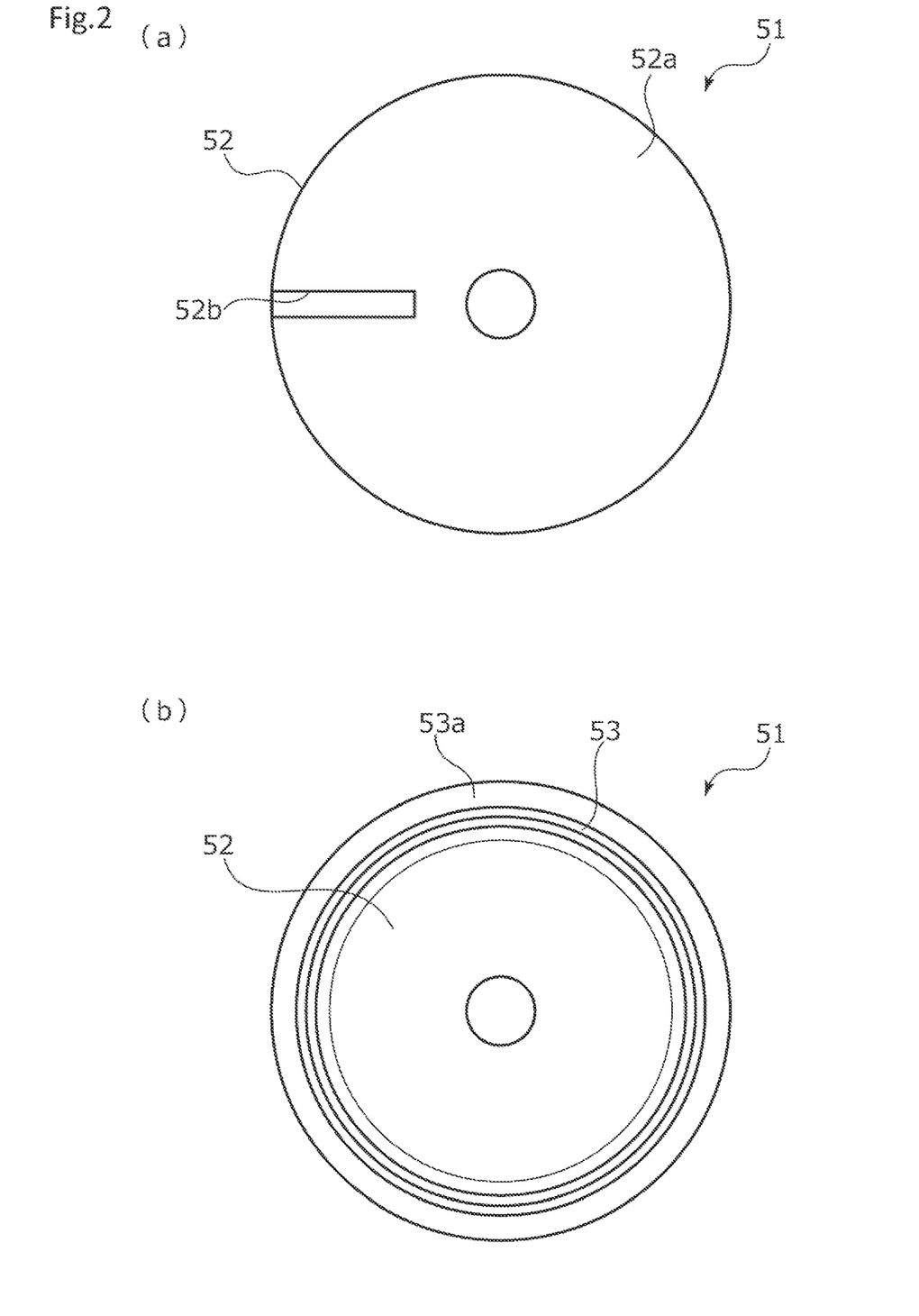
FIGS. 2(a) and 2(b) are views for describing a valve body of the solenoid valve of the first embodiment.

As illustrated in FIG. 1, a solenoid valve 1 includes a valve unit 9 and a solenoid 80. The valve unit 9 mainly includes a valve housing 10, a valve body 51, and a coil spring 90 having a conical shape. The valve housing 10 is made of a metal material or a resin material. The valve body 51 and the coil spring 90 are disposed inside the valve housing 10. The solenoid 80 is connected to the valve housing 10, and exerts a driving force on the valve body 51.

First, a configuration of the valve unit 9 will be described. Elements of the valve unit 9 are the valve housing 10, a valve 50, and the coil spring 90. In the valve housing 10, a small-diameter cylindrical portion 12; an intermediate cylindrical portion 14 having a larger inner diameter than the small-diameter cylindrical portion 12; and a cylindrical portion 15 having a slightly smaller inner diameter than the intermediate cylindrical portion 14 in order from a solenoid 80 side, namely, an upper side.

An annular step portion 11 expanded in a radially outward direction is formed at an upper end of the small-diameter cylindrical portion 12. An annular step portion 11 has an annular bottom surface extending in a radially inward direction and orthogonally to an annular inner peripheral surface extending in an up-down direction.

An annular rib 13 extending to a radially inner side is formed at a lower end of the small-diameter cylindrical portion 12. An upper surface of the annular rib 13 serves as a bottom surface 12a of the annular step portion 11. The inner diameter is constant between the annular step portion 11 and the annular rib 13.

The small-diameter cylindrical portion 12 defines a spring chamber 5 in which the coil spring 90 is disposed, together with a center post 82 to be described later.

Here, the coil spring 90 will be described. The coil spring 90 has a conical shape that is increased in diameter from the upper side toward a lower side, and includes a small-diameter end 91 and a large-diameter end 92. The small-diameter end 91 is in contact with a spring stopper 93, and the large-diameter end 92 is in contact with the bottom surface 12a of the small-diameter cylindrical portion 12.

The coil spring 90 is disposed in a state where the coil spring 90 is compressed between the bottom surface 12a of the small-diameter cylindrical portion 12 and the spring stopper 93. Accordingly, the coil spring 90 biases a rod 83 in a valve opening direction of the valve 50, namely, upward in an axial direction.

Returning to the description of the valve housing 10, the intermediate cylindrical portion 14 is formed continuously with the annular rib 13, and has a top surface 14a, an inner peripheral surface 14b, and a bottom surface 14c.

The top surface 14a extends in the radially outward direction, and is formed in an annular shape. Incidentally, a part of the top surface 14a serves as a radially inner-side end surface of the annular rib 13.

The inner peripheral surface 14b extends in a down direction and substantially orthogonally to a radially outer edge of the top surface 14a.

The bottom surface 14c extends in the radially inward direction and substantially orthogonally to a lower edge of the inner peripheral surface 14b, and is formed in an annular shape.

In addition, the top surface 14a extends longer in the radially inward direction than the bottom surface 14c.

In addition, six inflow passages 2 penetrating through the intermediate cylindrical portion 14 in a radial direction are evenly arranged in a peripheral wall of the intermediate cylindrical portion 14 in a circumferential direction.

In addition, the valve body 51 having a bottomed cylindrical shape is disposed on the intermediate cylindrical portion 14.

An outer diameter of the valve body 51 is a smaller diameter than an inner diameter of the inner peripheral surface 14b of the intermediate cylindrical portion 14. An outer peripheral surface of the valve body 51 is separated from the inner peripheral surface 14b of the intermediate cylindrical portion 14.

Here, the valve body 51 will be described. The valve body 51 includes a top portion 52 and a tubular portion 53.

The top portion 52 of the valve body 51 is formed in a disk shape, and a through-hole penetrating through the top portion 52 in the axial direction is formed at the center of the top portion 52 in the radial direction. In addition, an outer diameter of the top portion 52 has a longer than an inner diameter of the top surface 14a of the intermediate cylindrical portion 14. In such a manner, the top portion 52 is configured such that an upper end surface 52a thereof can come into contact with the top surface 14a.

In addition, as illustrated in FIGS. 1 and 2A, one groove 52b that is open in the radially outward direction and in an up direction and that extends the radially inward direction is formed on the upper end surface 52a of the top portion 52. The groove 52b communicates between a valve chamber 4 in which the valve body 51 is disposed and the spring chamber 5 in a fully open state of the valve 50 to be described later.

As illustrated in FIGS. 1 and 2B, the tubular portion 53 of the valve body 51 extends in the down direction and substantially orthogonally to a radially outer end of the top portion 52. In addition, a tapered surface 53a that is reduced in diameter in the down direction is formed at a lower end of the tubular portion 53.

In addition, a lower end of the rod 83 is press-fitted and fixed to the through-hole of the valve body 51. Incidentally, the rod 83 may be fixed to the valve body 51 by a method other than press-fitting.

Returning to the description of the valve housing 10, the cylindrical portion 15 on the lower side is continuous with the intermediate cylindrical portion 14, and extends in the down direction and substantially orthogonally to the bottom surface 14c of the intermediate cylindrical portion 14, and two step portions expanded in two stages are formed on the radially inner side of a lower end portion of the cylindrical portion 15.

In addition, a valve seat member 40 is internally fitted and crimp-fixed to the cylindrical portion 15. Incidentally, the valve seat member 40 may be fixed to the intermediate cylindrical portion 14 by a method other than crimping.

Here, the valve seat member 40 will be described. The valve seat member 40 includes an outflow passage 3 penetrating therethrough in the axial direction, and is formed in a cylindrical shape with steps on a radially outer side which allows the valve seat member 40 to be internally fitted to the cylindrical portion 15. In addition, a valve seat 40a having a tapered surface shape and reduced in diameter toward the lower side is formed on the radially inner side of an upper end of the valve seat member 40.

The tapered surface 53a of the valve body 51 can be seated on the valve seat 40a of the valve seat member 40. Namely, the valve seat 40a and the tapered surface 53a form the valve 50.

In addition, the intermediate cylindrical portion 14 on which the valve body 51 is disposed and the valve seat member 40 including the valve seat 40a define the valve chamber 4.

Next, the solenoid 80 will be described. The solenoid 80 mainly includes a holder 81, the center post 82 as a fixed iron core, the rod 83, a movable iron core 84, a can 85, a coil 86, and bearings 87 and 88.

The holder 81 is formed in a stepped cylindrical shape to which the center post 82 is inserted and fixed from below in the axial direction.

In addition, an opening portion 81a that is open in the down direction is formed in the holder 81.

The center post 82 is formed in a stepped cylindrical shape from a rigid body made of a magnetic material such as iron or silicon steel.

The center post 82 includes a body portion 82a having a cylindrical shape and extending in the axial direction. The bearing 87 is inserted and fixed to an upper end of the body portion 82a from above in the axial direction. In addition, the bearing 88 is inserted and fixed to a lower end of the body portion 82a from below in the axial direction.

In addition, a flange 82b continuous with the lower end of the body portion 82a and protruding in the radially outward direction is formed in the center post 82.

The rod 83 is formed in a columnar shape. The rod 83 is inserted into the center post 82 and the bearings 87 and 88, and is disposed to be reciprocatable in the axial direction.

In addition, the bearings 87 and 88 aligns the rod 83 and guides the movement of the rod 83 in the axial direction. Namely, the bearings 87 and 88 form an alignment structure for the rod 83.

In addition, an annular groove 83a that is open in the radially outward direction and that is recessed in the radially inward direction is formed in the rod 83 at a position above the lower end thereof. The spring stopper 93 that is a C-shaped thin plate is externally fitted and fixed to the annular groove 83a. Incidentally, the method for fixing the spring stopper 93 to the rod 83 may be changed as appropriate.

In addition, an upper end of the rod 83 is in contact with a lower end of the movable iron core 84. Accordingly, when the solenoid 80 is energized, the rod 83 moves while following the movable iron core 84 moving in a valve closing direction. Accordingly, the rod 83 moves the valve body 51 in the valve closing direction, namely, downward in the axial direction.

The can 85 is formed in a bottomed tubular shape, and is internally fitted and fixed to an opening portion of the holder 81, the opening portion being open to the upper side in the axial direction.

A part of the rod 83 and the movable iron core 84 are disposed inside the can 85 so as to be movable in the axial direction. In addition, the movement of the movable iron core 84 in the axial direction is guided by an inner peripheral surface of the can 85. Incidentally, the movable iron core 84 may not be guided by the can 85.

The coil 86 is an excitation coil wound around an outer side of the center post 82 with a bobbin interposed therebetween.

Figure 3:
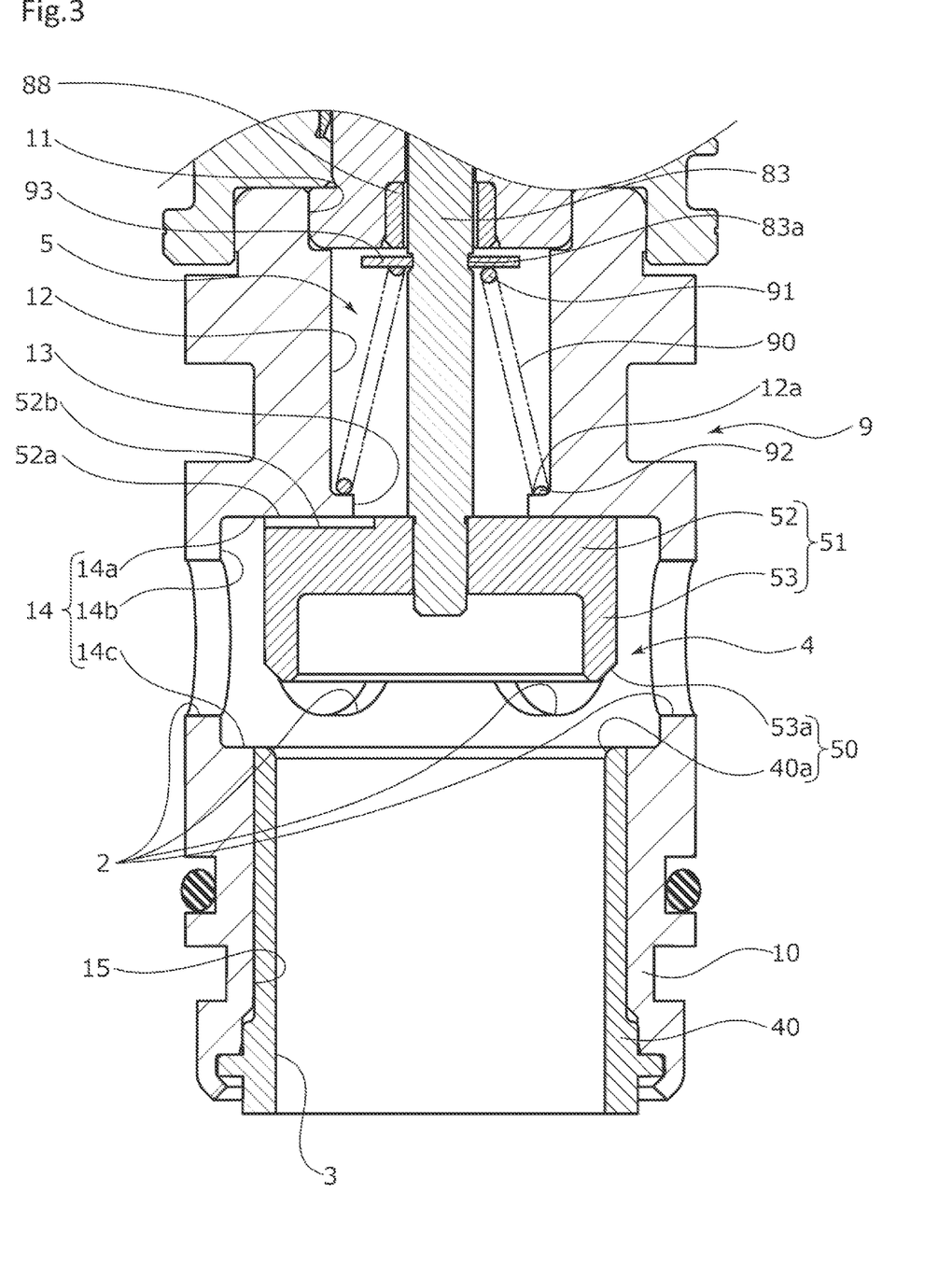
FIG. 3 is a cross-sectional view of main parts of the solenoid valve of the first embodiment when the valve is opened.
Figure 4:
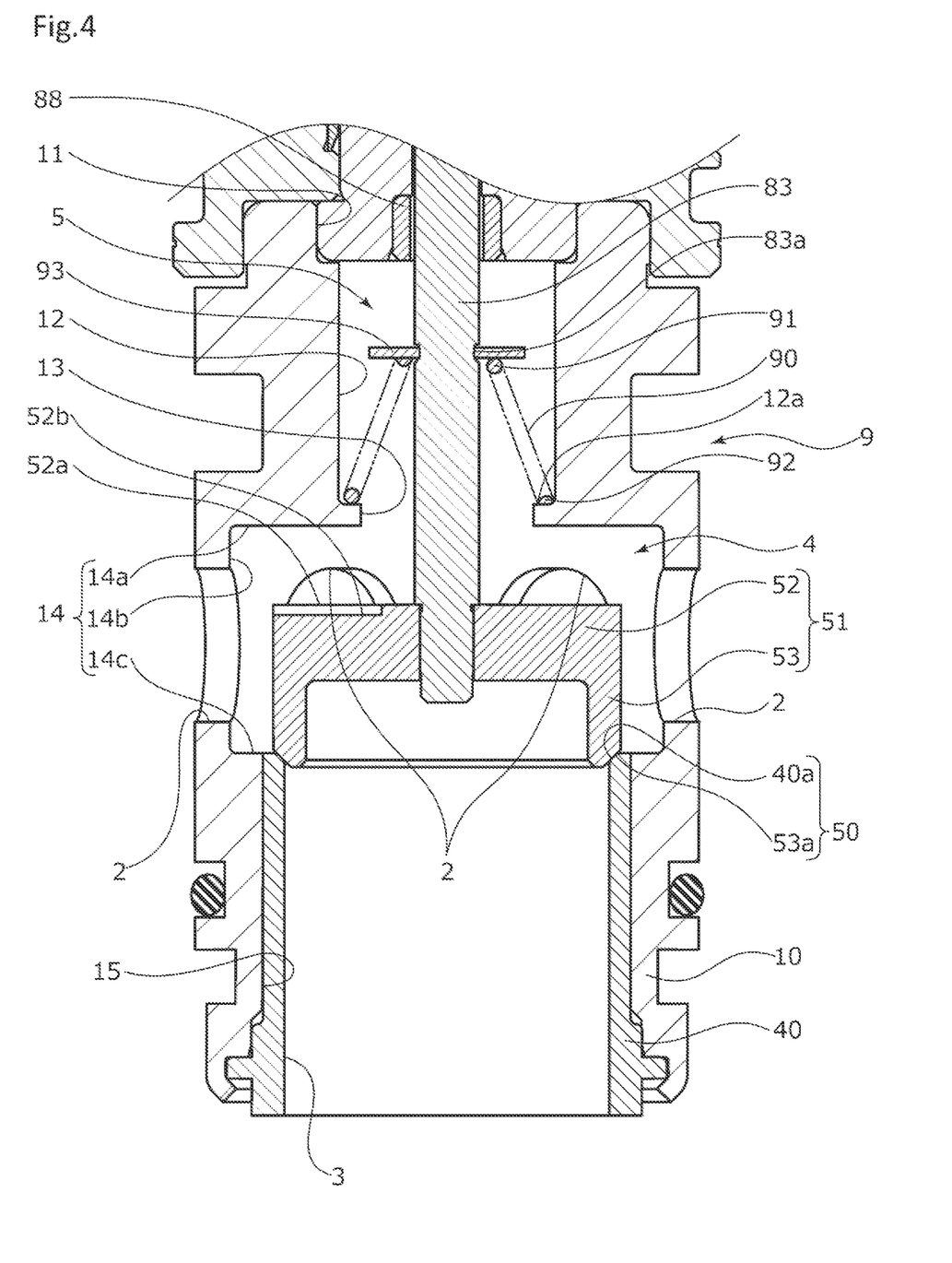
FIG. 4 is a cross-sectional view of the main parts of the solenoid valve of the first embodiment when the valve is closed.

Next, the operation of the solenoid valve 1 will be described with reference to FIGS. 3 and 4.

First, the solenoid valve 1 in a non-energized state will be described. Referring to FIG. 1, the valve 50 in a non-energized state is in an open state where the valve body 51 is separated from the valve seat 40a by the biasing force of the coil spring 90, and is in a fully open state.

In detail, the biasing force of the coil spring 90 presses the rod 83 to the upper side in the axial direction via the spring stopper 93. Accordingly, the upper end surface 52a of the valve body 51 is pressed against the top surface 14a of the valve housing 10.

In other words, the movement of the valve body 51 and the rod 83 to the upper side is restricted by the valve housing 10. In such a manner, since the valve housing 10 functions as a stopper that holds the position of the valve body 51 when the valve is opened, compared to a configuration that requires a separate stopper when the valve is opened, the configuration of the solenoid valve 1 is simplified.

In addition, the coil spring 90 is restricted in extension by the bottom surface 12a of the small-diameter cylindrical portion 12 and the spring stopper 93, and is in a compressed state.

When the valve 50 is opened, the fluid that has flowed into the valve chamber 4 through each of the inflow passages 2 flows to the outside of the solenoid valve 1 through the outflow passage 3.

At this time, the upper end surface 52a of the valve body 51 is in press contact with the top surface 14a of the valve housing 10, so that the spring chamber 5 is isolated from the valve chamber 4. For this reason, when the valve 50 is opened, it is extremely difficult for the fluid to flow into the spring chamber 5.

Accordingly, when the valve is opened, it is difficult for contamination to flow from the valve chamber 4 into the spring chamber 5, together with the fluid, and to impair the function of the solenoid 80 or the coil spring 90. For this reason, the solenoid valve 1 can stably control the flow rate or pressure of the fluid.

In addition, since the spring chamber 5 is isolated from the valve chamber 4, the fluid smoothly flows from the inflow passages 2 toward the outflow passage 3.

In addition, since the upper end surface 52a of the valve body 51 is in press contact with the top surface 14a of the valve housing 10, the valve body 51 can prevent the fluid from flowing into the spring chamber 5. For example, compared to a configuration in which the valve body 51 is stopped in the state of non-contact with the valve housing 10 while isolating the spring chamber 5 and the valve chamber 4 from each other, and a slight gap is formed between an outer periphery of the valve body and an inner periphery of the housing as in the prior patent literature described above, it is much more difficult for the fluid to flow into the spring chamber 5.

In addition, in a state where the upper end surface 52a of the valve body 51 is in press contact with the top surface 14a of the valve housing 10, the groove 52b of the valve body 51 forms a passage that communicates between the valve chamber 4 and the spring chamber 5, together with the top surface 14a. Namely, the configuration of the passage in the present embodiment is simple. As in the first embodiment, since the passage extends in the radial direction, even when the fluid flows through the valve chamber 4 in the axial direction in a state where the valve body 51 isolates the spring chamber 5 and the valve chamber 4 from each other, it is difficult for the fluid to flow into the passage, which is more preferable.

The groove 52b has a sufficiently narrow flow passage cross-sectional area, and has a throttle function. When a pressure difference occurs between a fluid pressure in the valve chamber 4 and a fluid pressure in the spring chamber 5 in a state where the valve chamber 4 and the spring chamber 5 are isolated from each other, the fluid moves gradually from a high-pressure side chamber toward a low-pressure side chamber.

In addition, compared to a case where a plurality of the grooves 52b are formed, in the solenoid valve 1 of the present embodiment in which only one groove 52b is formed, the flow of the fluid between the valve chamber 4 and the spring chamber 5 is less likely to occur.

For this reason, when the valve 50 is opened, in the solenoid valve 1, while the movement of the fluid for eliminating the pressure difference between the valve chamber 4 and the spring chamber 5 is allowed by the groove 52b, the fluid is extremely prevented from flowing in and out of the spring chamber 5 through the groove 52b.

Next, the solenoid valve 1 in an energized state will be described. In an energized state (namely, during so-called duty control), when an electromagnetic force generated by applying an electric current to the solenoid 80 becomes greater than the biasing force of the coil spring 90, the movable iron core 84 is attracted to a center post 82 side, namely, the lower side in the axial direction.

Accordingly, the rod 83 and the valve body 51 start moving downward in the axial direction, together with the movable iron core 84.

At this time, in a valve open state of the valve 50, since the fluid flows in and out of the spring chamber 5 from the valve chamber 4 through the groove 52b of the valve body 51 to reduce the pressure difference, at the start of energization, the valve body 51 smoothly moves in the valve closing direction.

In addition, when the upper end surface 52a of the valve body 51 attempts to separate from the top surface 14a of the valve housing 10, the volume of a space communicating with the spring chamber 5 momentarily increases; however, since the groove 52b is provided, almost no relative negative pressure is generated in the spring chamber 5.

For this reason, immediately after energization, the valve body 51 smoothly moves in the valve closing direction.

In addition, since the spring stopper 93 has a small diameter, the fluid is less likely to be subjected to resistance, and the driving force of the solenoid 80 can be reduced. For example, the reason is that the spring stopper 93 may have a smaller diameter compared to the case of using a cylindrical coil spring having the same diameter as the large-diameter end 92 of the coil spring 90.

In addition, since the coil spring 90 has a conical shape, the length of the spring chamber 5 in the axial direction can be shortened.

In addition, since the valve body 51 and the rod 83 are connected to each other, the valve body 51 is also aligned by aligning the rod 83 using the bearings 87 and 88. For example, if the valve body and the rod are simply in contact with each other, an alignment structure for the rod and an alignment structure for the valve body are individually required. Namely, according to the valve body 51 and the rod 83 connected to each other, guiding the sliding of the valve body 51 is not required, and the alignment structure can be simplified.

In addition, in the present embodiment, since the coil spring 90 is disposed in the spring chamber 5, the center post 82 or the movable iron core 84 is not limited in shape by the coil spring 90, and a sufficient magnetic path is easily formed.

In addition, the valve body 51 formed in a bottomed cylindrical shape is reduced in weight compared to a solid valve body formed in a columnar shape. For this reason, the coil spring 90 may have a small biasing force. Accordingly, the driving force of the solenoid 80 which is sufficient to counteract the biasing force of the coil spring 90 is also reduced.

The valve opening degree of the valve 50 decreases as the valve body 51 moves in the valve closing direction. In addition, when energization is performed using a predetermined electric current or higher, the valve 50 is closed (refer to FIG. 4).

In addition, when the valve 50 is closed, the flow of the fluid into the valve chamber 4 is also stopped. Accordingly, contamination is less likely to be caught between the rod 83 and the bearing 88.

When the electric current applied to the solenoid 80 is reduced, the rod 83 is moved in the valve opening direction by the biasing force of the coil spring 90, and the valve body 51 and the movable iron core 84 follow the movement.

When the electric current applied to the solenoid 80 reaches a specific value or less or zero, the upper end surface 52a of the valve body 51 comes into contact with the top surface 14a of the valve housing 10, and the valve reaches a fully open state.

Immediately before the upper end surface 52a of the valve body 51 comes into contact with the top surface 14a of the valve housing 10, the volume of the space communicating with the spring chamber 5 is momentarily reduced; however, since the groove 52b is provided, almost no relative positive pressure is generated in the spring chamber 5.

Accordingly, at the end of energization, the valve body 51 smoothly moves in the valve opening direction, and reaches a fully open state. Namely, the solenoid valve 1 can smoothly isolate the valve chamber 4 and the spring chamber 5 from each other.

In addition, immediately before the upper end surface 52a of the valve body 51 comes into contact with the top surface 14a of the valve housing 10, namely, when the valve 50 reaches a fully open state, the flow of the fluid from the spring chamber 5 toward the valve chamber 4 occurs between the spring chamber 5 and the valve chamber 4. Accordingly, contamination is easily discharged from the spring chamber 5.

Second Embodiment

Next, a solenoid valve according to a second embodiment of the present invention will be described with reference to FIG. 5. Incidentally, the same reference signs are assigned to the same components as the components illustrated in the first embodiment, and the duplicate descriptions will be omitted.

Figure 5:
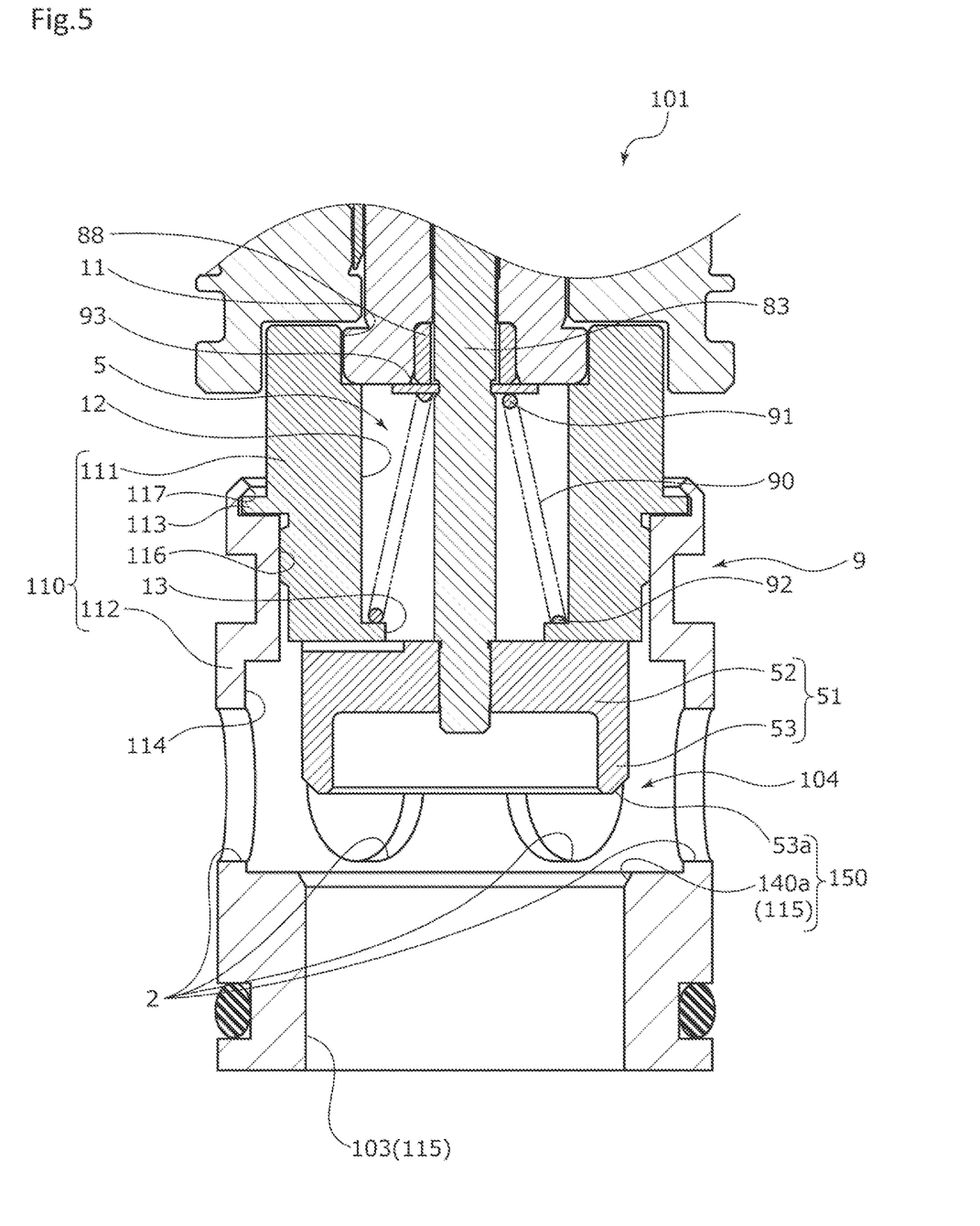
FIG. 5 is a cross-sectional view of main parts of a solenoid valve according to a second embodiment of the present invention when the valve is opened.

As illustrated in FIG. 5, a valve housing 110 of a solenoid valve 101 includes a first split body 111 and a second split body 112.

The small-diameter cylindrical portion 12 is formed on the radially inner side of the first split body 111. In addition, an annular rib 113 protruding from an outer peripheral surface to the radially outer side at the center in the axial direction of the first split body 111 is formed on the radially outer side of the first split body 111.

On the radially inner side of the second split body 112, a large-diameter cylindrical portion 116 that can be externally fitted to the outer peripheral surface of the first split body 111, an intermediate cylindrical portion 114 having a larger inner diameter than the large-diameter cylindrical portion 116, and a cylindrical portion 115 having a slightly smaller inner diameter than the intermediate cylindrical portion 114 are formed in order from the upper side in the axial direction.

An outer end and an upper end of the large-diameter cylindrical portion 116 forms a thin wall 117, and the thin wall 117 in an assembled state is crimped and inclined in the radially inward direction.

A valve chamber 104 is defined by the intermediate cylindrical portion 114 and the first split body 111.

The cylindrical portion 115 includes an outflow passage 103. In addition, a valve seat 140a having a tapered surface shape and reduced in diameter toward the lower side is formed at an upper end of the cylindrical portion 115. The valve seat 140a and the tapered surface 53a of the valve body 51 form a valve 150.

The valve housing 110 is assembled by press-fitting the first split body 111 into the large-diameter cylindrical portion 116 until the annular rib 113 of the first split body 111 comes into contact with an end surface of the second split body 112, the end surface being substantially orthogonal to the thin wall 117, and by crimping and locking the thin wall 117 of the second split body 112 to the annular rib 113.

Namely, the valve housing 110 is split into the first split body 111 and the second split body 112 on the upper side of the intermediate cylindrical portion 114 in which the valve body 51 is disposed. For this reason, in the valve housing 110, the valve body 51 can be disposed in the valve chamber 104 without using the valve seat member 40 as in the first embodiment. Accordingly, it is not necessary to ensure the valve seat member 40 or the strength of a peripheral wall of the cylindrical portion 115 that supports the valve seat member 40. In addition, the size of the valve housing 110 can be made smaller than the size of the valve housing 10 of the first embodiment.

Third Embodiment

Next, a solenoid valve according to a third embodiment of the present invention will be described with reference to FIG. 6. Incidentally, the same reference signs are assigned to the same components as the components illustrated in the first and second embodiments, and the duplicate descriptions will be omitted.

Figure 6:
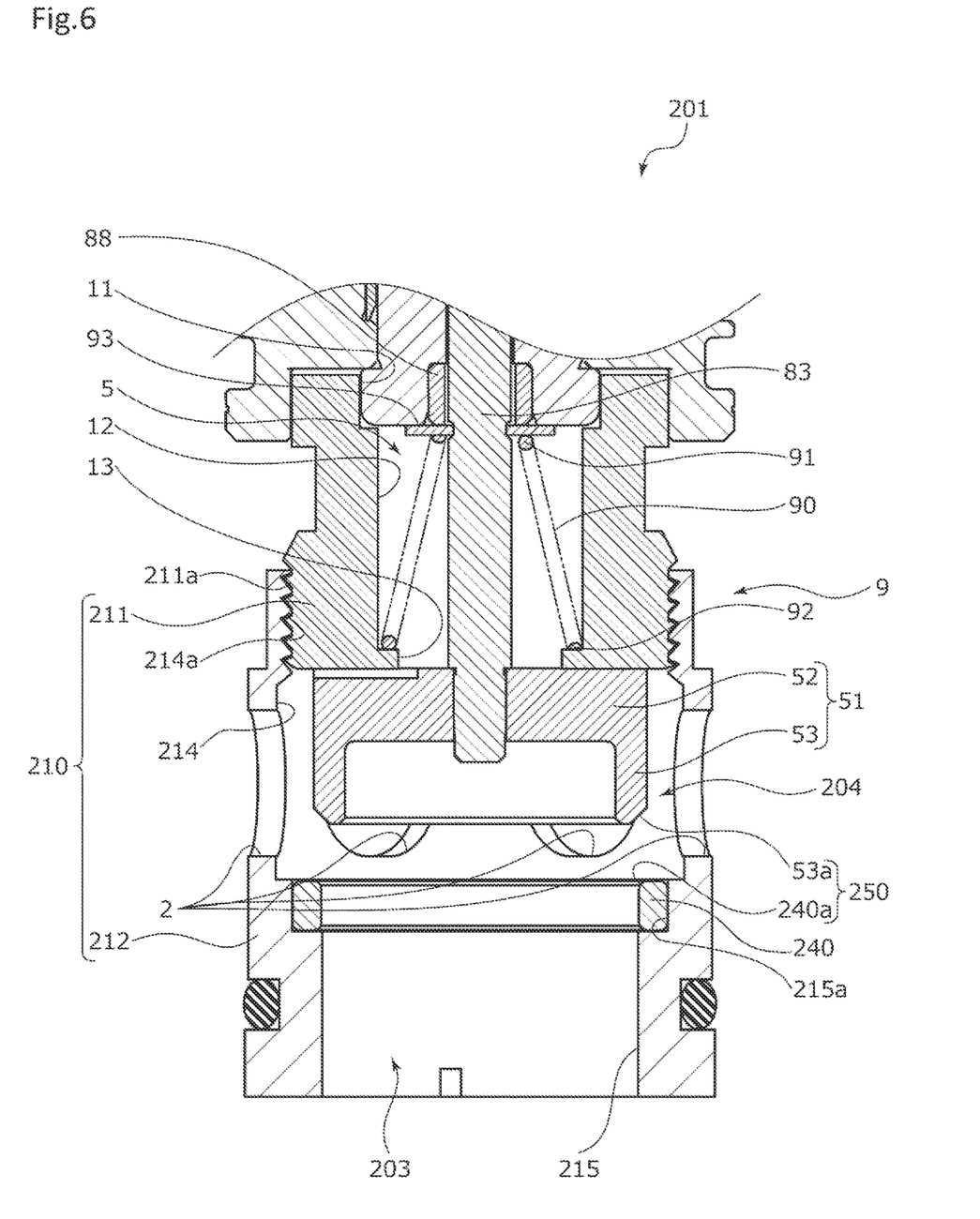
FIG. 6 is a cross-sectional view of main parts of a solenoid valve according to a third embodiment of the present invention when the valve is opened.

As illustrated in FIG. 6, a valve housing 210 of a solenoid valve 201 includes a first split body 211 and a second split body 212.

A male thread 211a is formed on an outer peripheral surface of a lower end portion of the first split body 211.

On the radially inner side of the second split body 212, an intermediate cylindrical portion 214 that can be externally fitted to the male thread 211a of the first split body 211 and a cylindrical portion 215 having a slightly smaller inner diameter than the intermediate cylindrical portion 214 are formed in order from the upper side in the axial direction.

A female thread 214a that can be screwed to the male thread 211a of the first split body 211 is formed at an upper end portion of the intermediate cylindrical portion 214.

An annular step portion 215a expanded in the radially outward direction is formed at an upper end of the cylindrical portion 215. A valve seat member 240 having an annular shape is internally fitted to the annular step portion 215a. A valve seat 240a of the valve seat member 240 and the tapered surface 53a of the valve body 51 form a valve 250. Incidentally, similarly to the second embodiment, the valve seat may be directly formed on the second split body.

In addition, a through-hole of the valve seat member 240 and a lower side of the annular step portion 215a in the cylindrical portion 215 form an outflow passage 203.

A valve chamber 204 is defined by the intermediate cylindrical portion 214, the valve seat member 240, and the first split body 211.

The valve housing 210 is assembled by screwing the male thread 211a of the first split body 211 to the female thread 214a of the second split body 212.

Accordingly, even when tolerances occur in the components, by adjusting a dimension for screwing the male thread 211a of the first split body 211 to the female thread 214a of the second split body 212, the opening degree of the valve 250 for electric current can be made substantially constant. Accordingly, in the valve housing 210, an increase in cost caused by a reduction in the tolerances of the components can be prevented.

The first to third embodiments of the present invention have been described above with reference to the drawings; however, the specific configurations are not limited to the first to third embodiments, and modifications or additions that are made without departing from the scope of the present invention are included in the present invention.

For example, in the first to third embodiments, a configuration in which the spring chamber is defined by the valve housing and the center post has been described; however, the present invention is not limited thereto, and the spring chamber may be defined by the holder and the center post, or may be configured by fixing a bottomed cylindrical member to the valve housing. The configuration of the spring chamber may be changed as appropriate as long as the spring chamber can be isolated from the valve chamber by the valve body.

In addition, in the first to third embodiments, the valve seat has been described as being formed on the valve seat member fixed to the valve housing; however, the present invention is not limited thereto, and the valve seat may be formed on the valve housing.

In addition, in the first to third embodiments, a configuration in which the spring chamber and the valve chamber are isolated from each other when the valve body comes into contact with the valve housing has been described; however, the present invention is not limited thereto, and for example, as a disposition configuration in which the movable iron core comes into contact with the can before the valve body comes into contact with the housing, the configuration may be such that an extremely small gap which is sufficient to restrict the inflow/outflow of the fluid into/from the spring chamber is formed between the valve housing and the valve body to isolate the spring chamber and the valve chamber from each other. In such a configuration, it is more preferable that the extremely small gap functions as a passage constriction.

In addition, in the first to third embodiments, a configuration in which the valve body comes into contact with the valve housing has been described; however, the valve body or the housing may be provided with an elastic member such as a gasket, and the elastic member may come into contact with a mating member in a valve open state.

In addition, in the first to third embodiments, a configuration in which only one groove is formed in the valve body has been described; however, the present invention is not limited thereto, and a plurality of the grooves may be formed. Particularly, with a configuration in which the grooves are evenly arranged, at a start-up for moving the valve body, which isolates the valve chamber and the spring chamber from each other, in the valve closing direction, the posture of the valve body can be easily held.

In addition, in the first to third embodiments, a configuration in which the groove is formed in the valve body has been described; however, the present invention is not limited thereto, and the groove may be formed in the housing. Further, the grooves may be formed in both the valve body and the housing.

In addition, in the first to third embodiments, the passage has been described as being formed of a groove; however, the present invention is not limited thereto, and the passage may be a gap formed by a rib, may be formed of a through-hole, or may be changed as appropriate.

In addition, in the first to third embodiments, a configuration in which the spring is a conical coil spring has been described; however, the present invention is not limited thereto, and the spring may be a cylindrical coil spring or a leaf spring, or may be changed as appropriate.

In addition, in the first to third embodiments, a configuration in which the spring is a compression spring has been described; however, the present invention is not limited thereto, and the spring may be a tension spring as long as the spring can bias in the valve opening direction.

In addition, in the first to third embodiments, a configuration in which the coil spring is in contact with the spring stopper has been described; however, the present invention is not limited thereto, and the coil spring may be directly fixed to the rod or the valve body by welding or the like.

In addition, in the first to third embodiments, a configuration in which the rod and the valve body are separate bodies has been described; however, the present invention is not limited thereto, and the rod and the valve body may be integrated.

In addition, in the first to third embodiments, a configuration in which the rod is in contact with the movable iron core has been described; however, the present invention is not limited thereto, and the rod and the movable iron core may be connected to each other.

In addition, in the first to third embodiments, a configuration in which the rod and the valve body are connected to each other has been described; however, the present invention is not limited thereto, and the rod and the valve body may not be connected to each other.

In addition, in the first and third embodiments, a configuration in which the valve body is formed in a bottomed cylindrical shape has been described; however, the present invention is not limited thereto, and the valve body may have a columnar shape or a conical shape, or may be changed as appropriate.

REFERENCE SIGNS LIST

1 Solenoid valve
2 Inflow passage
3 Outflow passage
4 Valve chamber
5 Spring chamber
10 Valve housing
40a Valve seat
50 Valve
51 Valve body
52b Groove (passage)
80 Solenoid
82 Center post (fixed iron core)
83 Rod
84 Movable iron core
90 Coil spring (conical coil spring)
91 Small-diameter end
93 Spring stopper

The invention claimed is:

1. A solenoid valve of poppet-type, comprising:
a valve body;
a valve seat on which the valve body is to be seated;
a solenoid including a movable iron core, a rod to which the valve body is connected, and a fixed iron core provided with a thorough hole, and exerting a driving force on the valve body in a valve closing direction;
a spring that biases the valve body in a valve opening direction; and
a valve housing partially defining a valve chamber in which the valve body and the valve seat are disposed,
wherein a spring chamber in which the spring is disposed is formed between the valve chamber and the fixed iron core,
the valve chamber and the spring chamber communicate with each other, and
when the valve body is most separated from the valve seat, the valve chamber and the spring chamber communicate with each other through a throttle passage which is, in flow passage cross-sectional area, smaller than a passage space defined by an outer surface of the valve body and an inner surface of the valve housing which face to each other,
the through hole of the fixed iron core has bearings inserted and fixed thereto,
the rod is inserted into the bearings inserted to the through hole of the fixed iron core, and
the valve body has an axial length which is smaller than a maximum outer diameter of the valve body.

2. The solenoid valve according to claim 1,
wherein the valve body is brought into contact with the valve housing when the valve body is most separated from the valve seat.

3. The solenoid valve according to claim 1,
wherein the throttle passage is formed of a groove formed in the valve body.

4. The solenoid valve according to claim 1,
wherein the spring is a conical coil spring, and
the rod is provided with a spring stopper with which a small-diameter end of the spring comes into contact.

5. The solenoid valve according to claim 1,
wherein the valve body and the rod are connected to each other.

6. The solenoid valve according to claim 2,
wherein the valve body and the rod are connected to each other.

7. The solenoid valve according to claim 3,
wherein the valve body and the rod are connected to each other.

8. The solenoid valve according to claim 4,
wherein the valve body and the rod are connected to each other.

\* \* \* \* \*